(12) United States Patent
Wilson, Sr.

(10) Patent No.: US 6,935,742 B1
(45) Date of Patent: Aug. 30, 2005

(54) SUPPORT STRAP FOR HOLDING EYEWEAR ON HATS

(76) Inventor: Anthony J. Wilson, Sr., 1791 Rie Rie Dr., Anchorage, AK (US) 99507

( * ) Notice: Subject to any disclaimer, the term of this patent is extended or adjusted under 35 U.S.C. 154(b) by 0 days.

(21) Appl. No.: 10/899,930

(22) Filed: Jul. 27, 2004

(51) Int. Cl.$^7$ .............................................. G02C 3/00
(52) U.S. Cl. .......................... 351/155; 351/158; 2/10; 24/3.3; 249/902
(58) Field of Search ............................... 351/155, 158; 2/10; 24/3.3, 3.7, 3.8, 3.12; 248/902, 309.1; 211/13.1, 85.1

(56) References Cited

U.S. PATENT DOCUMENTS

| | | | |
|---|---|---|---|
| 982,242 A * | 1/1911 | Campbell | ..................... 24/3.5 |
| 1,296,366 A * | 3/1919 | Clark | ............................. 2/10 |
| 2,248,331 A * | 7/1941 | Blodjer | ............................. 2/10 |
| 6,491,390 B1 * | 12/2002 | Provost | ..................... 351/155 |
| 6,792,619 B1 * | 9/2004 | Morris et al. | ..................... 2/10 |

* cited by examiner

*Primary Examiner*—Huy Mai
(74) *Attorney, Agent, or Firm*—Michael J. Tavella

(57) ABSTRACT

A strap that has two hooks placed on the ends and a curved clip in the center of the strap. The strap is elastic so that it holds onto a hat brim firmly. Once in place, the strap stays on the brim until it is needed. Because there is no large clip, the strap can be used on sun visors as well as hats. To store eye ware, the user places the eye ware on the brim and flips the curved clip over the bridge of the glasses. To release the glasses, the user simply flips the curved hook back, thereby releasing the glasses. Moreover, the user can easily remove the strap when it is not needed. Thus, the device does not permanently alter the look of the hat. Finally, because the device hooks onto the brim, it does not alter the feel of the hat when worn.

11 Claims, 5 Drawing Sheets

SUPPORT STRAP FOR HOLDING EYEWEAR ON HATS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates supports for eyewear and particularly to support straps for holding eyewear on hats 2. Description of the Prior Art Sunglasses are a feature of modern outdoor life. However, wearers frequently put on their sunglasses and remove them again. When entering a darkened building from the outside, for instance, sunglasses may hinder the wearer's eyesight. Upon leaving the building, the wearer may want to put the sunglasses back on again, as the sudden change in light level can cause discomfort for the wearer.

Manufacturers of sunglasses usually provide cases for carrying the sunglasses when they are not being worn. Repeatedly inserting the glasses in the case and then removing them can be annoying for the wearer. In addition, the wearer may have to carry the sunglass case in a pocket, which creates bulges. Moreover, there are times when wearers may not be wearing clothing with pockets.

Many people do not carry their eyewear in cases. They simply fold them and place them in a pocket or, frequently, they place them above their face. This can be done by sliding the glasses into the hair. Often, people wear ball caps, sun visors or other types of hats. Wearers frequently place the eyewear on top of the bill of these types of hats. In this way, the eyewear is out of the way until it is needed.

While convenient, this method does have drawbacks. Primarily, there is nothing to hold the eyewear in place. Thus, the eyewear can fall off the hat when the user bends down, for example. Several devices have been developed to hold eyewear on such hats that are improvements over simply putting the glasses on the bill. Such devices are found in following U.S. Pat. No. 6,184,748 teaches a clip that attaches to the bill of a cap. The eyewear must be folded and then slipped under the clip to hold it in place. There are several problems with this design. First, the clip is large. Thus, it can only fit on caps with large bills. Second, the glasses must be folded before storing them. This runs counter to the typical practice of simple slipping the glasses above the face onto the hat brim. Third, removing the glasses can be awkward. The glasses must be pushed or lifted out of the clip and then opened before use. This again runs counter to the typical practice. Finally, the glasses contact the clip when being stored. Over time, the contact of the lenses with the clip can lead to scratched lenses, which damage and eventually ruin the eyewear. U.S. Pat. No., 5,898,472 teaches a reel device that attaches to the back of a hat. A pair of cords extends from the reel and attaches to the earpieces of the eyewear. Here, the user can place the eyewear on the hat brim and the cords retract into the reel to hold the glasses in place. When needed, the glasses are simply pulled down and placed on the face as normal. The reel dispenses cord as needed to allow the glasses to be worn. This device incorporates the use of cords, which are a common method of carrying glasses. Although this is superior to the clip discussed above, it also has drawbacks. First, not everyone likes the look and feel of the cords. Second, a bulky reel must be attached to the back of the hat. This can cause discomfort and can be a nuisance when the eyewear is not needed. U.S. Pat. No. 6,644,807 teaches a pair of temple holders. In this device, the hat has a pair of holes cut into the sides of the hat. A pair of holders is then attached to the inside of the hat. The holders then pass through the holes in the sides. The holders are designed to receive the earpieces of a pair of glasses. In one case, hollow tubes are used to receive the earpieces. In other embodiments, snaps or hook and loop fasteners are used to secure the earpieces. To use the device, the user places the glasses on top of the brim and then secures the earpieces to the holders. This device has several problems. First, the hat must be modified with the holes and the holders. Because these holders are attached inside the hat, they interfere with the fit and are annoying. In addition, the eyeglasses must be modified. If the temples are not straight, the hollow tubes cannot be used. In the other embodiments, snaps or hook and loop fasteners must be attached to the eyewear before the device can be used. U.S. Pat. No. 6,481,059 teaches a pair of clips that mount to the sides of the hat. In this case, the glasses are placed on the brim as before and the temples are slid or otherwise placed into the clamps on the side of the hat. Although this device is an improvement, it still requires a hat to hold the clips. A sun visor, for example could not easily be used as it lacks sufficient sidewalls to hold the clips. Finally, U.S. Pat. No. 4,179,753 discloses a system in which a clip is fastened to the front center portion of a cap. A band that has openings on the sides in then placed around the brim. (In place of the band two side clips ay also be used). In this design, the user places the bridge of the glasses in the clip on the front of the cap. The earpieces are then slid into the band or held in the clips on the side of the hat. Although this is a good system, it still requires modifications to the hat. The large clip is mounted in the center of the front of the cap. If the cap has any kind of design logo, it will be covered or destroyed by the clip. The band or side clips must be attached to cap as well. As before, although this works when the glasses are needed, it must be removed or ignored when the glasses are not needed. Of course, if the user wants to leave the hat unmodified for display in a collection or for simply showing the hat as it truly appears, this device cannot be readily used. Finally, the device cannot be used on sun visors, as they do not typically have a large front portion to which the clip can be attached.

BRIEF DESCRIPTION OF THE INVENTION

The instant invention overcomes all of these difficulties. It is a strap that has two hooks placed on the ends. It has a curved clip in the center of the strap. The strap is elastic so that it holds on a hat brim firmly. Once in place, the strap stays on the brim until it is needed. Because there is no large clip, the strap can be used on sun visors as well as hats. To store eye ware, the user places the eye ware on the brim and flips the curved clip over the bridge of the glasses. In this way, the glasses are held securely on the hat. To release the glasses, the user simply flips the curved hook back, thereby releasing the glasses. In this way, the user has a simple, tool to hold glasses when not needed. Moreover, because the device is held simply by hooks, the user can easily remove the strap when it is not needed. Thus, the device does not permanently alter the look of the hat. Finally, because the device hooks onto the brim, it does not alter the feel of the hat when worn. There are no protrusions, or reels that affect how the hat fits, leaving s simple, comfortable way to hold glasses on a hat.

DETAILED DESCRIPTION OF THE INVENTION

Figure 1:
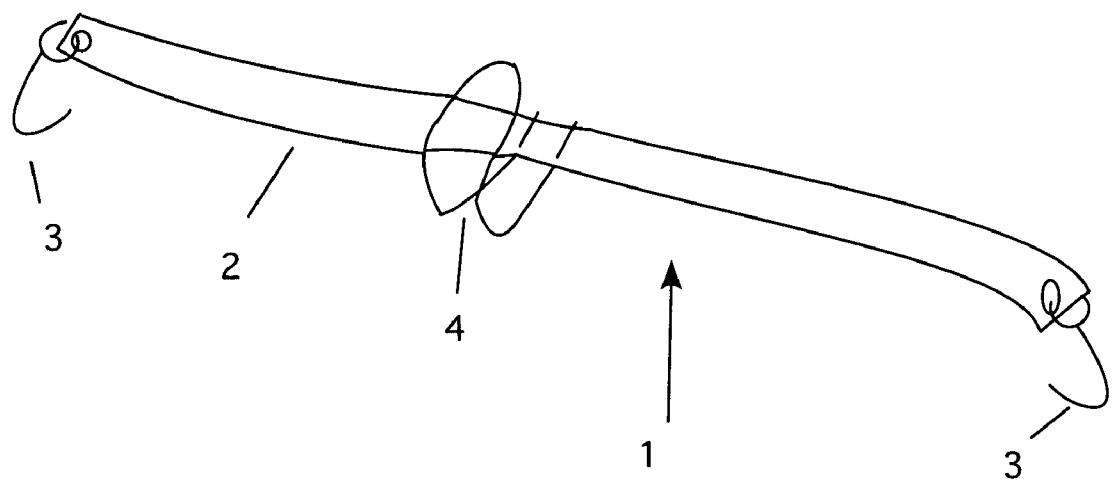
FIG. 1 is a perspective view of the invention.

Referring now to FIG. 1, the invention 1 is shown. It consists of a resilient strap 2 that has two hooks 3 attached to the ends of the strap as shown. The strap can be reinforced at the ends to help strengthen the parts of the strap that hold the hooks. In the preferred embodiment, the strap is made of a rubber material, although any other type of elastic or resilient material can be used. At the center of the strap 2 is an attachment hook 4. This hook 4 is secured to the strap at its base 5. The hook 4 then extends upward above the top of the strap as shown, where it curls over slightly.

Figure 2:
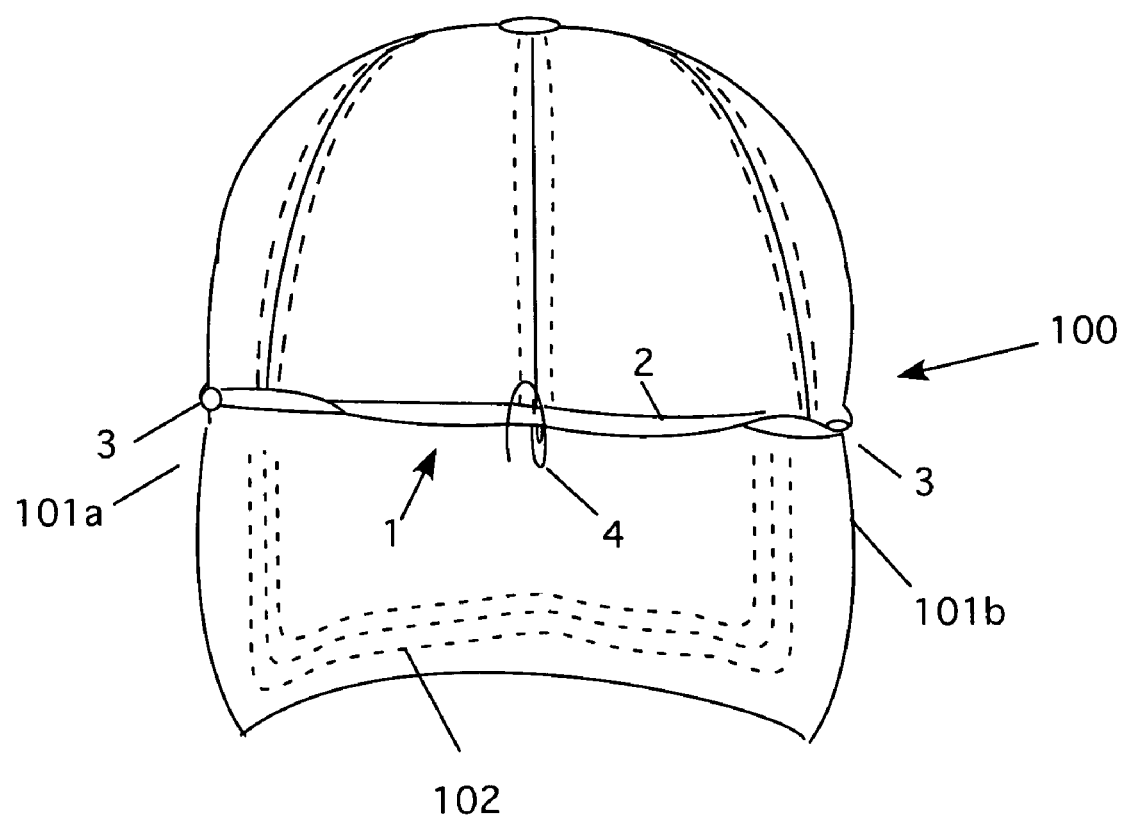
FIG. 2 is a front view of the invention installed on a hat.

FIG. 2 shows the invention 1 installed on a hat 100. The installation is simple. One of the two hooks 3 is placed over the edge 101a of the brim 102. The strap is then pulled until it reaches the other end 101b of the brim 102. Here, the remaining hook 3 is engaged with the brim. The invention then remains in place until needed. Note that the strap does not interfere with wearing the hat and is comfortable for the wearer.

Figure 3:
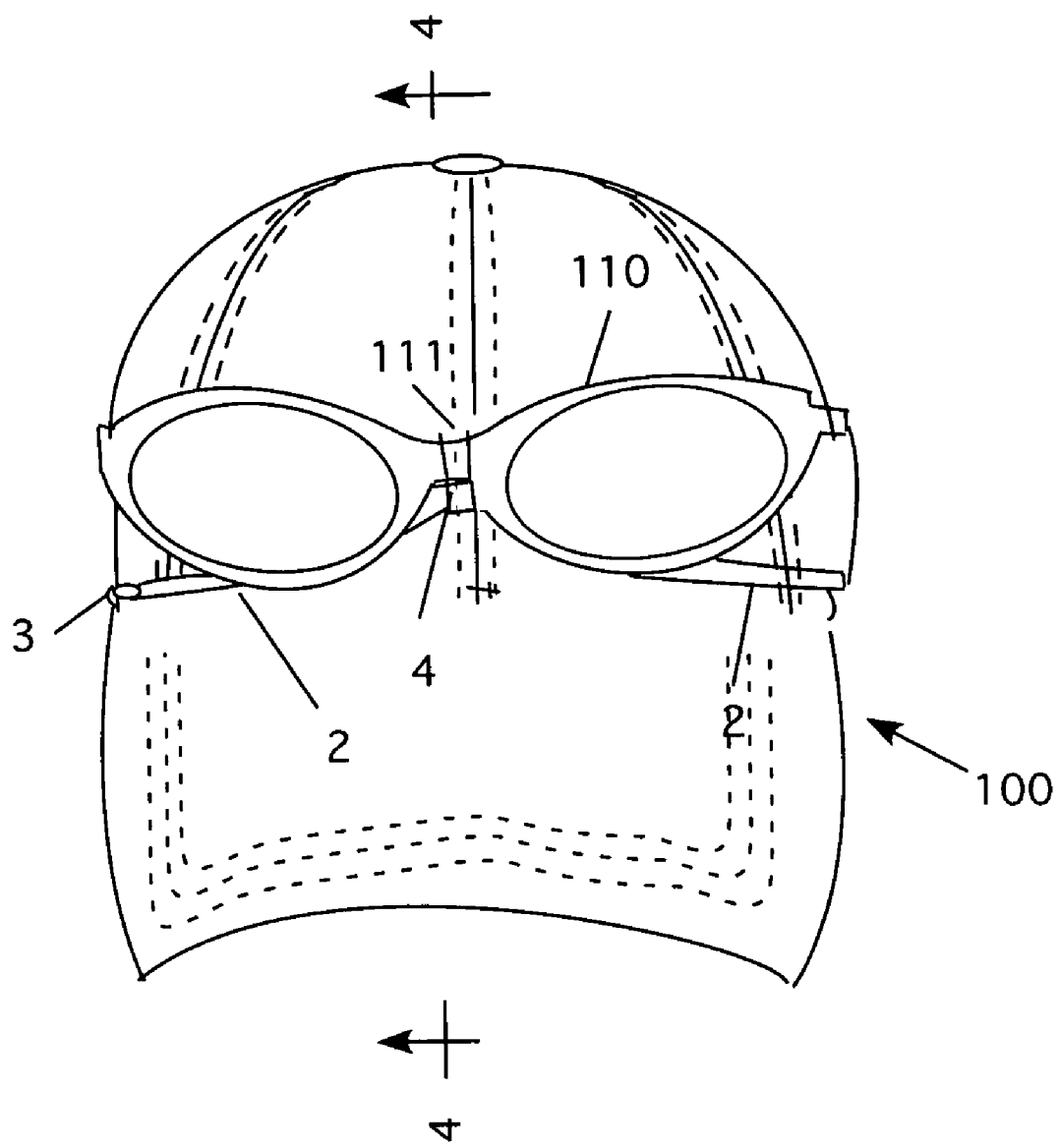
FIG. 3 is a front view of the invention installed on a hat, holding a pair of glasses.
Figure 4:
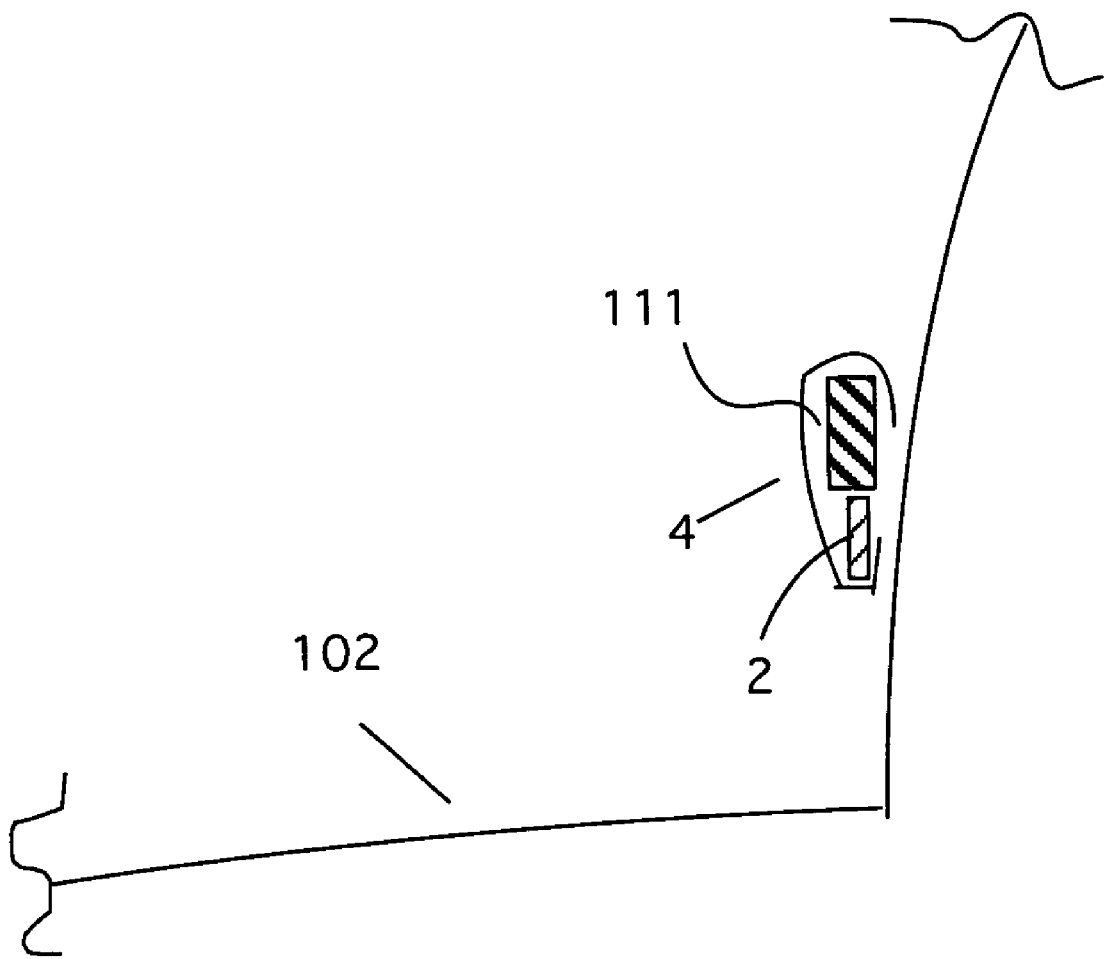
FIG. 4 is a cross-sectional view of the invention holding a pair of glasses taken along the lines 4—4 of FIG. 3.

FIG. 3 shows a pair of glasses 110 being held by the strap in place on the hat 100. Here, the hook 4 is folded over the bridge 111 of the glasses as shown. Note that the strap is pulled up slightly to accommodate the glasses when in place. FIG. 4 is a cross section through the bridge of the glasses when mounted on the hat. Here, the bridge 111 is held by the hook 4, which is held by the strap 2.

Figure 5:
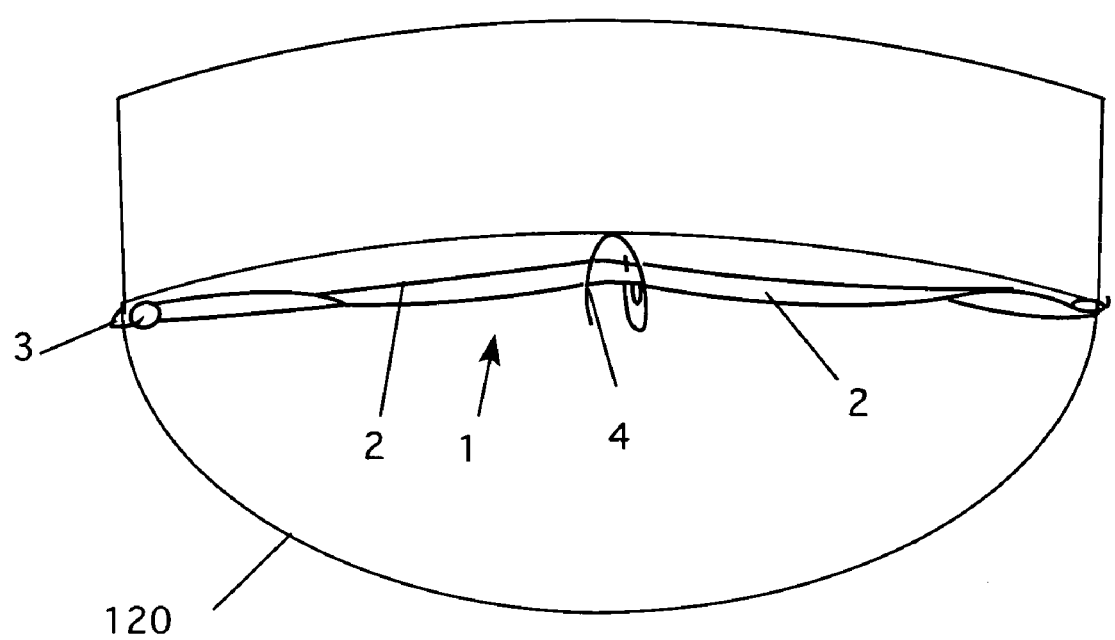
FIG. 5 is a front view of the invention installed on a sun visor.

FIG. 5 shows the invention 1 installed on a sun visor 120. Here, there is no full crown as on a hat. However, because the strap is attached to the brim, no full crown is needed to hold a pair of glasses.

To remove the glasses, the user simply rolls the hook 4 forward until the glasses are released. They then can be pulled down, ready to wear.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A holder for eyewear comprising:
   a) a resilient strap having two ends and a center;
   b) a pair of hooks, one of said pair of hooks being attached to each of said two ends; and
   c) a center hook, said center hook being fastened to said strap at the center of said strap, said center hook having a hook radius sized to fit over a bridge on a pair of eyeglasses.

2. A holder for eyewear for use on headwear having a brim comprising
   a) a resilient strap having two ends and a center;
   b) a pair of hooks, one of said pair of hooks being attached to each of said two ends;
   c) whereby the pair of hooks is removably attached to the brim of said headwear; and
   d) a center hook, said center hook being fastened to said strap at the center of said strap, said center hook having a hook radius sized to fit over a bridge on a pair of eyeglasses.

3. The holder of claim 2 wherein the resilient strap is made of a rubber material.

4. The holder of claim 2 wherein the headwear is a hat.

5. The holder of claim 2 wherein the headwear is a sun visor.

6. The holder of claim 2 wherein the pair of eyeglasses is a pair of sunglasses.

7. A holder for eyewear comprising:
   a) a resilient strap having two ends and a center;
   b) a pair of hooks, one of said pair of hooks being attached to each of said two ends; and
   c) a center hook, said center hook having a first end, fixedly attached to said strap, an extension piece, attached to said first end and extending outward therefrom, a curved upper member, a second extension piece extending downward from said curved upper member, and a second end, fixedly attached to said strap, and further wherein said extension piece, said curved upper member, and said second extension piece form a hook having a radius sized to fit over a bridge on a pair of eyeglasses.

8. The holder of claim 7 wherein the pair of hooks is removably attached to a brim of an article of headwear.

9. The holder of claim 8 wherein the article of headwear is a hat.

10. The holder of claim 8 wherein the article of headwear is a sun visor.

11. The holder of claim 8 wherein the pair of eyeglasses is a pair of sunglasses.

* * * * *